US012129363B2

(12) United States Patent
Heitsch et al.

(10) Patent No.: US 12,129,363 B2
(45) Date of Patent: *Oct. 29, 2024

(54) POLYETHYLENE-BASED COMPOSITIONS AND FILMS AND ARTICLES COMPRISING THE SAME

(71) Applicant: Dow Global Technologies LLC, Midland, MI (US)

(72) Inventors: Andrew T. Heitsch, Angleton, TX (US); Sanjib Biswas, Manvel, TX (US); Mridula Kapur, Lake Jackson, TX (US); Alexander Williamson, Rosharon, TX (US); Philip P. Fontaine, Pearland, TX (US); Joshua B. Gaubert, Pearland, TX (US); Daniel W. Baugh, III, Lake Jackson, TX (US); Jin Wang, Midland, MI (US); Didem Oner-Deliormanli, Bellaire, TX (US); Hitendra K. Singh, Missouri City, TX (US); Shadid Askar, Houston, TX (US); Arnaldo T. Lorenzo, Tarragona (ES); Mehmet Demirors, Pearland, TX (US); Vivek Kalihari, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/432,449

(22) PCT Filed: May 1, 2020

(86) PCT No.: PCT/US2020/031151
§ 371 (c)(1),
(2) Date: Aug. 19, 2021

(87) PCT Pub. No.: WO2020/223688
PCT Pub. Date: Nov. 5, 2020

(65) Prior Publication Data
US 2022/0056250 A1 Feb. 24, 2022

Related U.S. Application Data

(60) Provisional application No. 62/842,253, filed on May 2, 2019.

(51) Int. Cl.
*C08L 23/06* (2006.01)
*C08K 3/36* (2006.01)
*C08K 5/098* (2006.01)

(52) U.S. Cl.
CPC ............... *C08L 23/06* (2013.01); *C08K 3/36* (2013.01); *C08K 5/098* (2013.01); *C08L 2201/14* (2013.01); *C08L 2203/16* (2013.01); *C08L 2205/025* (2013.01)

(58) Field of Classification Search
CPC .......... C08L 23/04; C08L 23/06; C08L 23/08; C08L 23/0807; C08L 23/0815; C08L 23/0823; C08L 2205/02; C08L 2205/025; C08L 2205/024; C08K 5/0083; C08K 5/092; C08K 5/098
See application file for complete search history.

(56) References Cited

U.S. PATENT DOCUMENTS

| 5,562,905 | A | 10/1996 | Kenealy et al. |
|---|---|---|---|
| 6,127,484 | A | 10/2000 | Cribbs et al. |
| 6,599,971 | B2 | 7/2003 | Dotson et al. |
| 7,332,536 | B2 | 2/2008 | Dotson et al. |
| 8,026,305 | B2 | 9/2011 | McLeod et al. |
| 8,372,931 | B2 | 2/2013 | Hermel-Davidock et al. |
| 8,476,394 | B2 | 7/2013 | St. Jean et al. |
| 8,580,893 | B2 | 11/2013 | McLeod et al. |
| 8,829,115 | B2 | 9/2014 | Hermel-Davidock et al. |
| 9,187,628 | B2 | 11/2015 | McLeod et al. |
| 9,359,494 | B2 | 6/2016 | McLeod et al. |
| 9,587,093 | B2 | 3/2017 | Aubee et al. |
| 9,631,059 | B2 | 4/2017 | Demirors et al. |
| 9,644,087 | B2 | 5/2017 | Aubee et al. |
| 9,783,663 | B2 | 10/2017 | Wang |
| 9,850,369 | B2 | 12/2017 | Aubee et al. |
| 2006/0047078 | A1 | 3/2006 | Swabey et al. |
| 2007/0043182 | A1 | 2/2007 | Martin et al. |
| 2007/0213439 | A1 | 9/2007 | Wolters et al. |

(Continued)

FOREIGN PATENT DOCUMENTS

| CA | 2568454 A1 | 5/2008 |
|---|---|---|
| CA | 2594472 A1 | 1/2009 |

(Continued)

OTHER PUBLICATIONS

PCT/US2020/031151, International Search Report and Written Opinion with a mailing date of Sep. 17, 2020.
PCT/US2020/031151, International Preliminary Report on Patentability with a mailing date of Nov. 2, 2021.

*Primary Examiner* — John M Cooney
*Assistant Examiner* — Jeffrey S Lenihan
(74) *Attorney, Agent, or Firm* — Jacob R. Graham

(57) ABSTRACT

The present invention is directed to polyethylene-based compositions suitable for packaging applications, films, and articles. The polyethylene-based composition according to embodiments disclosed herein includes a polyethylene composition having a first polyethylene fraction and a second polyethylene fraction as well as a calcium salt of 1,2-cyclohexanedicarbodylic acid. The polyethylene-based composition can deliver a balance of properties, including barrier properties, for packaging applications.

10 Claims, No Drawings

(56) References Cited

U.S. PATENT DOCUMENTS

| | | |
|---|---|---|
| 2008/0118749 A1 | 5/2008 | Aubee et al. |
| 2008/0227900 A1 | 9/2008 | Borke et al. |
| 2009/0029182 A1 | 1/2009 | Aubee et al. |
| 2010/0081767 A1 | 4/2010 | McLeod et al. |
| 2010/0159173 A1 | 6/2010 | Ashbaugh et al. |
| 2011/0143155 A1 | 6/2011 | Aubee et al. |
| 2012/0107542 A1 | 5/2012 | Nelson et al. |
| 2013/0165590 A1 | 6/2013 | McLeod et al. |
| 2017/0130040 A1 | 5/2017 | Aubee et al. |

FOREIGN PATENT DOCUMENTS

| | | |
|---|---|---|
| CA | 2688092 A1 | 6/2011 |
| CA | 2798854 | 6/2014 |
| EP | 0799274 B1 | 10/1997 |
| EP | 1834986 A1 | 9/2007 |
| EP | 1994091 A1 | 11/2008 |
| EP | 2118193 A1 | 11/2009 |
| WO | 2001070827 A1 | 9/2001 |
| WO | 2004000933 A1 | 12/2003 |
| WO | 2005090464 | 9/2005 |
| WO | 2010047743 A1 | 4/2010 |
| WO | 2016135590 A1 | 9/2016 |
| WO | 2017112510 A1 | 6/2017 |

POLYETHYLENE-BASED COMPOSITIONS AND FILMS AND ARTICLES COMPRISING THE SAME

FIELD

The present invention relates to polyethylene-based compositions, to films comprising such polyethylene-based compositions, and to articles comprising such polyethylene-based compositions.

INTRODUCTION

Some packages such as food packages are designed to protect the contents from the external environment and to facilitate a longer shelf. Such packages are often constructed using barrier films with low oxygen transmission rates (OTR) and water vapor transmission rates (WVTR). However, in balancing the barrier properties, consideration is also given to package integrity to, for example, avoid leakage.

For many years, the films industry has endeavored to reduce water vapor transmission rates by various techniques. Some of these are described, for example, in U.S. Pat. No. 5,562,905, EP 0 799 274B1, WO 01/70827, and WO2005/090464A1. Other approaches are described in U.S. Pat. No. 6,127,484 and WO 2004/000933A1.

Prior work in literature highlights the complex relationship between resin morphology, molecular properties, film fabrication conditions and the resulting water vapor barrier performance.

It would be desirable to have new polyethylene resins that can provide improved water vapor barrier performance in addition to having good processability and other properties.

SUMMARY

The present invention provides polyethylene-based compositions suitable for packaging applications, films, and articles. The polyethylene-based compositions, when incorporated into a film, provide improved moisture vapor barrier. In some embodiments, the polyethylene-based compositions, when incorporated into film, provide improved moisture vapor barrier performance (reduced amount of water vapor passing through film) while also maintaining desired physical properties. By being polyethylene-based, the compositions, according to some embodiments of the present invention, can be incorporated into multilayer films and articles that are comprised primarily, if not substantially or entirely, of polyolefins in order to provide a film and articles that are more easily recyclable. In some embodiments, polyethylene-based compositions of the present invention can be incorporated into a surface layer of a film and exhibit a relatively low level of dusting.

In one aspect, a polyethylene-based composition suitable for packaging applications comprises (a) at least 97% by weight, based on the total weight of the polyethylene-based composition, of a polyethylene composition comprising:
  (i) from 25 to 37 percent by weight of a first polyethylene fraction having a density in the range of 0.935 to 0.947 g/cm$^3$ and a melt index (I$_2$) of less than 0.1 g/10 minutes; and
  (ii) from 63 to 75 percent by weight of a second polyethylene fraction; and (b) 90 to 540 ppm, based on the total weight of the polyethylene-based composition of a calcium salt of 1,2-cyclohexanedicarboxylic acid, wherein the polyethylene composition has less than 0.10 branches per 1,000 carbon atoms when measured using $^{13}$C NMR, wherein the density of the polyethylene-based composition is at least 0.965 g/cm$^3$, and wherein the melt index (I$_2$) of the polyethylene-based composition is 0.5 to 10 g/10 minutes. In some embodiments, the polyethylene composition comprises from 25 to 37 percent by weight of the first polyethylene fraction having a density in the range of 0.940 to 0.947 g/cm$^3$ and from 63 to 75 percent by weight of the second polyethylene fraction having a density of 0.970 g/cm$^3$ or greater.

In another aspect, the present invention relates to a film comprising any of the polyethylene-based compositions disclosed herein.

In another aspect, the present invention relates to an article, such as a food package, comprising any of the polyethylene-based compositions or films disclosed herein.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer as defined hereafter, and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "homopolymer," as used herein, refers to polymers prepared from only one type of monomer with the understanding that trace amounts of impurities can be incorporated into the polymer structure.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are C$_3$-C$_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (α) position.

"Polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and typically have a molecular weight distribution ("MWD") greater than 2.5.

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 to 0.912 g/cm$^3$.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The present invention generally relates to polyethylene-based compositions suitable for packaging applications. When incorporated into films, the polyethylene-based compositions can provide a reduction in water vapor transmission rates. Without wishing to be bound by theory, it is believed that the combination of a unique design for a polyethylene composition and a specific amount of a nucleator can deliver improved barrier performance. The inventive polyethylene-based compositions can be incorporated into films and articles having improved barrier and in particular, increased barrier to water vapor. Because the inventive compositions are polyethylene-based, in some embodiments, the films and articles can be formed entirely or substantially entirely from polyolefins making the films and articles more readily recyclable.

In one aspect, a polyethylene-based composition suitable for packaging applications comprises (a) at least 97% by weight, based on the total weight of the polyethylene-based composition, of a polyethylene composition comprising:
  (i) from 25 to 37 percent by weight of a first polyethylene fraction having a density in the range of 0.935 to 0.947 g/cm$^3$ and a melt index (I$_2$) of less than 0.1 g/10 minutes; and
  (ii) from 63 to 75 percent by weight of a second polyethylene fraction; and (b) 90 to 540 ppm, based on the total weight of the polyethylene-based composition of a calcium salt of 1,2-cyclohexanedicarboxylic acid, wherein the polyethylene composition has less than 0.10 branches per 1,000 carbon atoms when measured using $^{13}$C NMR, wherein the density of the polyethylene-based composition is at least 0.965 g/cm$^3$, and wherein the melt index (I$_2$) of the polyethylene-based composition is 0.5 to 10 g/10 minutes.

In some embodiments, the first polyethylene fraction has a density of 0.940 to 0.947 g/cm$^3$. In some embodiments, the second polyethylene fraction has a density of 0.970 g/cm$^3$ or more. In some embodiments, the polyethylene composition comprises from 25 to 37 percent by weight of the first polyethylene fraction having a density in the range of 0.940 to 0.947 g/cm$^3$ and from 63 to 75 percent by weight of the second polyethylene fraction having a density of 0.970 g/cm$^3$ or greater.

In some embodiments, the polyethylene composition comprises 30 to 37 percent by weight of the first polyethylene fraction.

In some embodiments, the second polyethylene fraction has a melt index ($I_2$) of at least 100 g/10 minutes. In some embodiments, the second polyethylene fraction has a melt index ($I_2$) of at least 100 g/10 minutes and to 10,000 g/10 minutes or more. The second polyethylene fraction has a melt index ($I_2$) of at least 100 g/10 minutes and up to 10,000 g/10 minutes, in some embodiments. The second polyethylene fraction has a melt index ($I_2$) of at least 100 g/10 minutes and up to 1,000 g/10 minutes, in some embodiments. In some embodiments, the ratio of the melt index ($I_2$) of the second polyethylene fraction to the melt index ($I_2$) of the first polyethylene fraction is at least 1,000.

In some embodiments, the polyethylene-based composition has an overall melt index ($I_2$) of 2.5 g/10 minutes or less.

In some embodiments, the polyethylene-based composition has a zero shear viscosity ratio of less than 2.0.

In some embodiments, the polyethylene composition has less than 0.05 branches per 1,000 carbon atoms when measured using $^{13}$C NMR. The polyethylene composition has less than 0.03 branches per 1,000 carbon atoms when measured using $^{13}$C NMR in some embodiments. The polyethylene-based composition, in some embodiments, has less than 25 non-vinyl unsaturations per 1 million carbons. The polyethylene-based composition, in some embodiments, has less than 20 non-vinyl unsaturations per 1 million carbons. In some embodiments, the polyethylene composition has less than 0.05 branches per 1,000 carbon atoms when measured using $^{13}$C NMR and less than 20 non-vinyl unsaturations per 1 million carbons.

In some embodiments, the polyethylene-based composition further comprises a fatty acid metal salt in the amount of 45 to 360 ppm based on the total weight of the composition. The metal in the fatty acid metal salt is preferably zinc or magnesium. The fatty acid metal salt is at least one of zinc stearate and zinc palmitate, in some embodiments.

In some embodiments, the polyethylene-based composition further comprises silica in the amount of 75 to 800 ppm, based on the total weight of the composition.

In some embodiments, when the polyethylene-based composition is incorporated into a monolayer film, the film exhibits a WVTR of 0.1 or less (g-mil)/(100 in$^2$-day) when measured according to ASTM F1249-06 at 38° C. and 100% relative humidity.

In another aspect, the present invention relates to a film comprising any of the polyethylene-based compositions disclosed herein.

In another aspect, the present invention relates to an article, such as a food package, comprising any of the polyethylene-based compositions or films disclosed herein.

Polyethylene Composition

As discussed above, polyethylene-based compositions of the present invention comprise a polyethylene composition comprising (i) from 25 to 37 percent by weight of a first polyethylene fraction having a density in the range of 0.935 to 0.947 g/cm$^3$ and a melt index ($I_2$) of less than 0.1 g/10 minutes; and (ii) from 63 to 75 percent by weight of a second polyethylene fraction, wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

The polyethylene composition may comprise a combination of two or more embodiments as described herein.

In one embodiment, the polyethylene composition has a density of at least 0.965 g/cm$^3$. In some embodiments, the polyethylene composition has a density of at least 0.968 g/cm$^3$. The polyethylene composition, in some embodiments, has a density of up to 0.976 g/cm$^3$. In some embodiments, the polyethylene composition has a density in the range of 0.965 to 0.976 g/cm$^3$, for example from 0.965 to 0.970, or from 0.967 to 0.969, or from 0.965 to 0.970 g/cm$^3$. For example, the density can be from a lower limit of 0.965 or 0.967 g/cm$^3$, to an upper limit of 0.970, 0.972, 0.975, or 0.976 g/cm$^3$.

The polyethylene composition has a melt index ($I_2$ or 12; at 190° C./2.16 kg) from 0.5 to 10 g/10 minutes. For example, the melt index ($I_2$ or 12; at 190° C./2.16 kg) can be from a lower limit of 0.5, 0.7, 0.9, 1.0, 1.1, 1.2, 1.5, 2, 3, 4, or 5 g/10 minutes, to an upper limit of 1.5, 2, 2.5, 3, 4, 5, 6, 7, 8, 9, or 10 g/10 minutes. In some embodiments, the polyethylene composition has a melt index ($I_2$) from 0.5 to 5 g/10 minutes, or from 0.5 to 2.5 g/10 minutes, or from 0.7 to 3 g/10 minutes, or from 1.0 to 2.0 g/10 minutes, or from 1.0 to 1.5 g/10 minutes.

In some embodiments, the polyethylene composition has a melt index ratio ($I_{10}/I_2$) of 10 or more. The polyethylene composition has a melt index ratio ($I_{10}/I_2$) of up to 17 in some embodiments. In some embodiments, the polyethylene composition has a melt index ratio ($I_{10}/I_2$) of 10 to 17. The polyethylene composition has a melt index ratio ($I_{10}/I_2$) of 12 to 17 in some embodiments.

The polyethylene composition has low levels of branching. The polyethylene composition has less than 0.10 branches per 1,000 carbon atoms when measured using $^{13}$C NMR in some embodiments. The polyethylene composition, in some embodiments has less than 0.07 branches per 1,000 carbon atoms when measured using $^{13}$C NMR. The polyethylene composition has less than 0.05 branches per 1,000 carbon atoms when measured using $^{13}$C NMR in some embodiments. In some embodiments, the polyethylene composition has less than 0.03 branches per 1,000 carbon atoms when measured using $^{13}$C NMR.

In some embodiments, the polyethylene composition has low levels of non-vinyl unsaturations. In some embodiments, the polyethylene composition has less than 25 non-vinyl unsaturations per 1 million carbons when measured using $^1$H NMR. The polyethylene composition, in some embodiments, has less than 20 non-vinyl unsaturations per 1 million carbons when measured using $^1$H NMR.

Without wishing to be bound by theory, it is believed that the combination of low levels of branching and low levels of non-vinyl unsaturation in the polyethylene compositions provide a greater amount of crystallinity in the polyethylene compositions, thereby improving its barrier properties when formed into a film.

In one embodiment, the polyethylene composition has a ZSVR value of less than 2.0, or from 1.0 to 2.0, or from 1.2 to 1.8, or from 1.3 to 1.7.

In one embodiment, the polyethylene composition has a molecular weight distribution, expressed as the ratio of the weight average molecular weight to number average molecular weight ($M_w/M_n$; as determined by conv. GPC) in the range of from 8.0 to 14.0. For example, the molecular weight distribution ($M_w/M_n$) can be from a lower limit of 8.0, 8.5, 9.0, or 9.5 to an upper limit of 10.0, 11.0, 11.5, 12.0, 12.5, 13.0, 13.5, or 14.0. In some embodiments, the $M_w/M_n$ is from 10.0 to 12.0.

In one embodiment, the polyethylene composition has a number average molecular weight ($M_n$; as determined by conv. GPC) in the range from 8,000 to 20,000 g/mole. For example, the number average molecular weight can be from a lower limit of 8,000, 9,000, 10,000, or 11,000 g/mole, to an upper limit of 12,000, 13,000, 15,000, or 20,000 g/mole.

In one embodiment, the polyethylene composition has a weight average molecular weight ($M_w$; as determined by conv. GPC) in the range from 100,000 to 125,000 g/mole.

For example, the weight average molecular weight can be from a lower limit of 100,000, 105,000, or 110,000 g/mole, to an upper limit of 115,000, 120,000, or 124,000 g/mole.

In one embodiment, the polyethylene composition has a z average molecular weight ($M_z$; as determined by conv. GPC) of at least 350,000 g/mole, such as in the range from 350,000 to 600,000 g/mole. For example, the z average molecular weight can be from a lower limit of 350,000, 375,000, 400,000, 405,000, or 410,000 g/mole, to an upper limit of 420,000, 425,000, 450,000, 475,000, 500,000, 550,000, or 600,000 g/mole.

In one embodiment, the polyethylene composition has a $M_z/M_w$ ratio (each as determined by conv. GPC) of greater than 3.0. The polyethylene composition has a $M_z/M_w$ ratio (each as determined by conv. GPC) of greater than 3.5 in some embodiments. The $M_z/M_w$ can be from 3.0 to 4.0 in some embodiments, or from 3.5 to 4.5 in some embodiments, or from 3.5 to 4.0 in some embodiments.

In one embodiment, the polyethylene composition has a ZSVR of less than 2.0 and a $M_z/M_w$ ratio (each as determined by conv. GPC) of greater than 3.0. In another embodiment, the polyethylene compositions has a ZSVR of less than 2.0 and a $M_z/M_w$ ratio (each as determined by conv. GPC) of greater than 3.5.

The polyethylene composition preferably comprises ethylene-based polymers formed in the absence of comonomers. In some embodiments, the polyethylene composition comprises at least 99% by weight ethylene-based polymers formed in the absence of comonomers. In some embodiments, the polyethylene composition comprises at least 99% by weight polymers comprising a majority amount (>99 mol %) of units which have been derived from ethylene monomer.

The polyethylene compositions used in polyethylene-based compositions of the present invention comprise two fractions of polyethylenes.

The first polyethylene fraction has a density of 0.935 to 0.947 g/cm³. In some embodiments, the first polyethylene fraction has a density of 0.940 to 0.947 g/cm³. The first polyethylene fraction has a melt index ($I_2$) of less than 0.1 g/10 minutes. In some embodiments, the first polyethylene fraction has a melt index ($I_2$) of 0.01 g/10 minutes or greater. The first polyethylene fraction has a melt index from 0.05 to 0.1 g/10 minutes in some embodiments. The first polyethylene fraction, in some embodiments, has less than 0.10 branches per 1,000 carbon atoms when measured using $^{13}C$ NMR.

In some embodiments, the second polyethylene fraction has a density of 0.970 g/cm³ or more. In some embodiments, the first polyethylene fraction has a density of 0.940 to 0.947 g/cm³, and the second polyethylene fraction has a density of 0.970 g/cm³ or more. In some embodiments, the second polyethylene fraction has a melt index ($I_2$) of at least 100 g/10 minutes. In some embodiments, the second polyethylene fraction has a melt index ($I_2$) of at least 100 g/10 minutes and up to 10,000 g/10 minutes or more. The second polyethylene fraction has a melt index ($I_2$) of at least 100 g/10 minutes and up to 10,000 g/10 minutes, in some embodiments. The second polyethylene fraction has a melt index ($I_2$) of at least 100 g/10 minutes and up to 1,000 g/10 minutes, in some embodiments.

In some embodiments, the ratio of the melt index ($I_2$) of the second polyethylene fraction to the melt index ($I_2$) of the first polyethylene fraction is at least 1,000.

The polyethylene composition comprises from 25 to 37 percent by weight of the first polyethylene fraction and from 63 to 75 percent by weight of the second polyethylene fraction, based on the total weight of the polyethylene composition. In some embodiments, the polyethylene composition comprises 30 to 37 percent by weight of the first polyethylene fraction and 63 to 70 percent by weight of the second polyethylene fraction, based on the total weight of the polyethylene composition.

The polyethylene-based composition comprises at least 97% by weight of the polyethylene composition, based on the total weight of the polyethylene-based composition. In some embodiments, the polyethylene-based composition comprises up to 99% by weight of the polyethylene composition, based on the total weight of the polyethylene-based composition. The polyethylene-based composition, in some embodiments, comprises from 97% to 98% by weight of the polyethylene composition, based on the total weight of the polyethylene-based composition.

The following discussion focuses on preparation of the first composition for use in embodiments of the present invention.

Polymerization

Any conventional polymerization processes may be employed to produce the polyethylene composition. Such conventional polymerization processes include, but are not limited to, slurry polymerization processes, solution polymerization process, using one or more conventional reactors e.g. loop reactors, isothermal reactors, stirred tank reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process occurs in one or more well-mixed reactors such as one or more isothermal loop reactors or one or more adiabatic reactors at a temperature in the range of from 115 to 250° C.; for example, from 115 to 200° C., and at pressures in the range of from 300 to 1,000 psi; for example, from 400 to 750 psi. In some embodiments, in a dual reactor, the temperature in the first reactor is in the range of from 115 to 190° C., for example, from 115 to 175° C., and the second reactor temperature is in the range of 150 to 250° C., for example, from 130 to 165° C. In other embodiments, in a single reactor, the temperature in the reactor is in the range of from 115 to 250° C., for example, from 115 to 225° C.

The residence time in solution phase polymerization process may be in the range of from 2 to 30 minutes; for example, from 10 to 20 minutes. Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the polyethylene composition and solvent is then removed from the reactor and the polyethylene composition is isolated. Solvent is typically recovered via a solvent recovery unit, i.e. heat exchangers and vapor liquid separator drum, and is then recycled back into the polymerization system.

In one embodiment, the polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the polyethylene composition may be produced via solution polymerization in a single reactor system, for example a single loop reactor system, wherein ethylene is polymerized in the presence of two catalyst systems. In some embodiments, only ethylene is polymerized.

Catalyst Systems

Specific embodiments of catalyst systems that can be used to produce the polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl (—$C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis $[(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$ arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C*HCH_3$, and —$(CH_2)_4C*(H)(CH_3)$—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —C(O)—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2] octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), $S(O)_2$, $Si(R^C)_2$, $P(R^P)$, $N(R^N)$, —N=$C(R^C)_2$, —Ge $(R^C)_2$—, or —$Si(R^C)$—, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$ heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-$S(O)_2$—, $(C_1-C_{40})$hydrocarbyl-Si $(R^C)_2$—, $(C_1-C_{40})$hydrocarbyl-$N(R^N)$—, $(C_1-C_{40})$hydrocarbyl-$P(R^P)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$ heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6, 5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F⁻), chloride (Cl⁻), bromide (Br⁻), or iodide (I⁻). The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

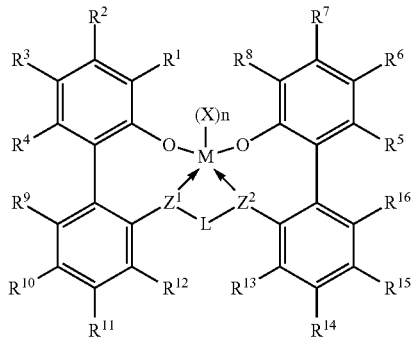

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is $(C_1-C_{40})$hydrocarbylene or $(C_1-C_4)$heterohydrocarbylene, wherein the $(C_1-C_4)$hydrocarbylene has a portion that comprises a 1-carbon atom to 10-carbon atom linker backbone linking the two Z groups in Formula (I) (to which L is bonded) or the $(C_1-C_4)$heterohydrocarbylene has a portion that comprises a 1-atom to 10-atom linker backbone linking the two Z groups in Formula (I), wherein each of the 1 to 10 atoms of the 1-atom to 10-atom linker backbone of the $(C_1-C_{40})$heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is $(C_1-C_{30})$hydrocarbyl or $(C_1-C_{30})$heterohydrocarbyl; $R^1$ and $R^8$ are independently selected from the group consisting of —H, $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

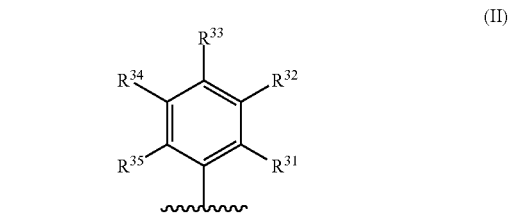

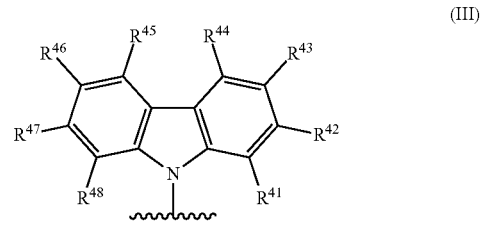

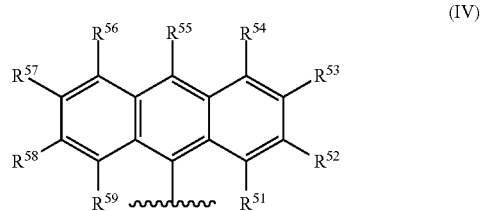

In formulas (II), (III), and (IV), each of $R^{31-35}$, $R^{41-48}$, or $R^{51-59}$ is independently chosen from $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, halogen, and —H.

In some embodiments, the polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula $C_{86}H_{128}F_2GeO_4Zr$ and the following structure:

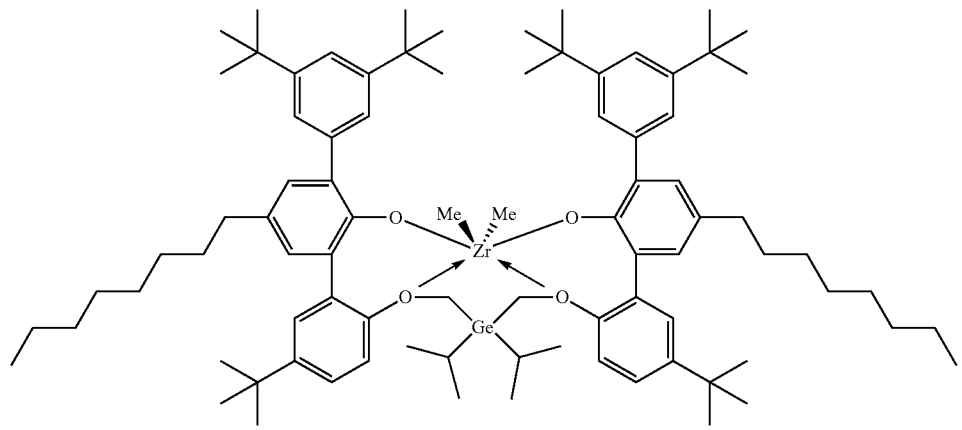

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1']-biphenyl]-2-olato-κO]](2-)]dimethyl, having the chemical formula $C_{107}H_{154}N_2O_4Si_2Zr$ and the following structure:

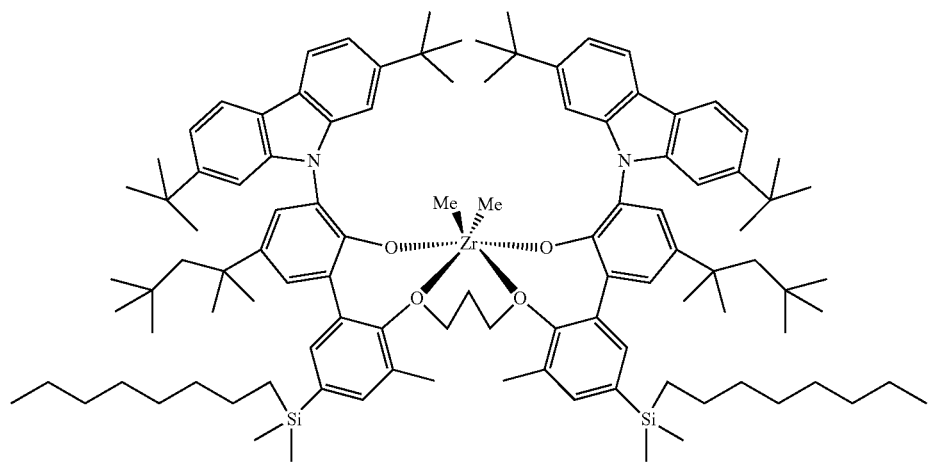

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2{}^+$, ($C_1$-$C_{20}$)hydrocarbylN(H)$_3{}^+$, or N(H)$_4{}^+$, wherein each ($C_1$-$C_{20}$)hydrocarbyl, when two or more are present, may be the same or different.

Combinations of neutral Lewis acid activators (co-catalysts) include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate($1^-$) amine, and combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Calcium Salt of 1,2-cyclohexanedicarboxylic Acid

The polyethylene-based compositions of the present invention further comprise a calcium salt of 1,2-cyclohexanedicarboxylic acid. The calcium salt of 1,2-cyclohexanedicarboxylic acid is a type of nucleator that, when used in the appropriate amount and in combination with the polyethylene compositions described herein, has been found to provide a significant improvement in moisture barrier for films formed from the polyethylene-based compositions (i.e., a reduction in the amount of moisture transmitted through the film).

The amount of calcium salt of 1,2-cyclohexanedicarboxylic acid used in the polyethylene-based composition is important in providing the desired moisture barrier performance (i.e., a reduction in the amount of moisture transmitted through the film). The polyethylene-based composition comprises 90 to 540 ppm of calcium salt of 1,2-cyclohexanedicarboxylic acid, based on the total weight of the polyethylene-based composition. In some embodiments, the polyethylene-based composition comprises 150 to 525 ppm of calcium salt of 1,2-cyclohexanedicarboxylic acid, based on the total weight of the polyethylene-based composition. In some embodiments, the polyethylene-based composition comprises 165 to 495 ppm of calcium salt of 1,2-cyclohexanedicarboxylic acid, based on the total weight of the polyethylene-based composition.

In some embodiments, the calcium salt of 1,2-cyclohexanedicarboxylic acid may be provided with a fatty acid metal salt such as zinc stearate, zinc palmitate, and mixtures thereof. Based on how zinc stearate is prepared commercially, some zinc palmitate may also be present as commercial stearic acid often contains a substantial amount of palmitic acid. In some such embodiments, the polyethylene-based composition comprises 45 to 360 ppm of at least one of zinc stearate and zinc palmitate, based on the total weight of the polyethylene-based composition. In some embodiments, the polyethylene-based composition comprises 50 to 275 ppm of zinc stearate and/or zinc palmitate, based on the total weight of the polyethylene-based composition. In some embodiments, the polyethylene-based composition comprises 85 to 255 ppm of zinc stearate and/or zinc palmitate, based on the total weight of the polyethylene-based composition.

One non-limiting example of a calcium salt of 1,2-cyclohexanedicarboxylic acid that can be used in embodiments of the present invention is Hyperform HPN-20E from Milliken Chemical, Spartanburg, South Carolina. Hyperform HPN-20E comprises 60-70 weight percent of calcium salt of 1,2-cyclohexanedicarboxylic acid and 30-40 weight percent of zinc stearate/zinc palmitate. In some embodiments, the polyethylene-based composition comprises 150 to 800 ppm of Hyperform HPN-20E based on the total weight of the polyethylene-based composition. The polyethylene-based composition, in some embodiments, comprises 250 to 750 ppm of Hyperform HPN-20E based on the total weight of the polyethylene-based composition.

In some embodiments, the calcium salt of 1,2-cyclohexanedicarboxylic acid (and the fatty acid metal salt (e.g., zinc stearate and/or zinc palmitate) when also included) can be provided as a masterbatch by blending it with a carrier resin before combining with the polyethylene compositions described herein. In some such embodiments, the carrier resin is a polyethylene having a melt index ($I_2$) of 4 to 12 g/10 minutes. In some embodiments where the calcium salt of 1,2-cyclohexanedicarboxylic acid and zinc stearate/zinc palmitate are provided as a masterbatch, the masterbatch comprises 2 to 4 weight percent of the calcium salt of 1,2-cyclohexanedicarboxylic acid and zinc stearate/zinc palmitate, based on the total weight of the masterbatch. In one embodiment, the carrier resin is a narrow molecular weight distribution high density polyethylene homopolymer having a density of 0.965 and a melt index ($I_2$) of 8 to 9 g/10 minutes. In some embodiments, the masterbatch can include other additives as well. Depending on the total amount of additives included, the masterbatch can comprise 85 to 98 weight percent of the carrier resin, based on the total weight of the masterbatch.

Silica

In some embodiments, the polyethylene composition further comprises silica. Silica, when used in the appropriate amount and in combination with the polyethylene compositions described herein, has been found to provide a reduced level of dusting in films formed from the polyethylene-based compositions.

The amount of silica used in the polyethylene-based composition can be important in reducing the level of dusting when the polyethylene-based composition is incorporated into a surface layer of a film. In some embodiments, the polyethylene-based composition comprises 75 to 800 ppm silica, based on the total weight of the polyethylene-based composition. In some embodiments, the polyethylene-based composition comprises 100 to 500 ppm of silica, based on the total weight of the polyethylene-based composition.

One non-limiting example of a silica that can be used in embodiments of the present invention is Sylobloc 45 commercially available from Grace Davison Company.

In some embodiments, talc can be used in addition to, or as an alternative to, silica.

In some embodiments, the silica can be provided as a masterbatch by blending it with a carrier resin, the calcium salt of 1,2-cyclohexanedicarboxylic acid, and zinc stearate/zinc palmitate before combining with the polyethylene compositions described herein. The masterbatch can be as described above in connection with the calcium salt of 1,2-cyclohexanedicarboxylic acid and zinc stearate/zinc palmitate. The amount of silica in the masterbatch can be based on the target silica for the overall polyethylene-based composition.

Films

In some embodiments, the present invention relates to a film formed from any of the inventive polyethylene-based compositions as described herein.

The polyethylene-based compositions, when incorporated into a film, provide improved moisture vapor barrier. In some embodiments, when the polyethylene-based composition is incorporated into a monolayer film, the film exhibits a WVTR of 0.15 or less (g-mil)/(100 in$^2$·day) when measured according to ASTM F1249-06 at 38° C. and 100% relative humidity. In some embodiments, when the polyethylene-based composition is incorporated into a monolayer film, the film exhibits a WVTR of 0.10 or less (g-mil)/(100 in$^2$·day) when measured according to ASTM F1249-06 at 38° C. and 100% relative humidity.

In some embodiments, when incorporated into a monolayer film or a surface layer of a multilayer film, the film can exhibit a desirable (i.e., low) level of dusting. A low level of dusting is advantageous during the film fabrication as well as film conversion to other articles. When the surface layer has a print, lower dusting also helps in better print retention on the article.

In some embodiments of multilayer films of the present invention, a multilayer film can include a polyethylene-based composition of the present invention in a surface layer and also in an inner layer. In some such embodiments, by using the same polyethylene-based composition in a surface layer and an inner layer, the multilayer film may be significantly simplified in terms of the number of different polymers incorporated in the multilayer film.

In some embodiments, the film is a blown film. In some embodiments, the film is a monolayer film. The film, in some embodiments, is a multilayer film. Films can be formed from the inventive polyethylene-based compositions using methods and equipment well-known to those of skill in the art.

The amount of the polyethylene-based composition to use in films of the present invention can depend on a number of factors including, for example, whether the film is a monolayer or multilayer film, the other layers in the film if it is a multilayer film, the desired barrier properties of the film, the end use application of the film, and others. In some embodiments where the film is a multilayer film, the inventive polyethylene-based composition can be provided in a single layer to provide a barrier property.

Films of the present invention can have a variety of thicknesses. The thickness of the blown film can depend on a number of factors including, for example, whether the film is a monolayer or multilayer film, the other layers in the film if it is a multilayer film, the desired properties of the film, the end use application of the film, the equipment available to manufacture the film, and others. In some embodiments, a film of the present invention has a thickness of up to 10 mils. For example, the blown film can have a thickness from a lower limit of 0.25 mils, 0.5 mils, 0.7 mils, 1.0 mil, 1.75 mils, or 2.0 mils to an upper limit of 4.0 mils, 6.0 mils, 8.0 mils, or 10 mils.

In embodiments where the film comprises a multilayer film, the number of layers in the film can depend on a number of factors including, for example, the desired properties of the film, the desired thickness of the film, the content of the other layers of the film, the end use application of the film, the equipment available to manufacture the film, and others. A multilayer blown film can comprise up to 2, 3, 4, 5, 6, 7, 8, 9, 10, or 11 layers in various embodiments.

The inventive polyethylene-based composition, in some embodiments, can be used in more than one layer of the film. Other layers within a multilayer film of the present invention can comprise, in various embodiments, a polymer selected from the following: the inventive composition, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present invention can comprise one or more tie layers known to those of skill in the art.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents. In some embodiments, the polyethylene-based composition comprises up to 3 weight percent of such additional additives. All individual values and subranges from 0 to 3 wt % are included and disclosed herein; for example, the total amount of additives in the polymer blend can be from a lower limit of 0.5, 1, 1.5, 2, 2.5, 3, 3.5, 4, or 4.5 wt % to an upper limit of 1, 2, 3, 4, or 5 wt %.

By being polyethylene-based, the inventive polyethylene-based compositions, according to some embodiments of the present invention, can be incorporated into multilayer films and articles that are comprised primarily, if not substantially or entirely, of polyolefins in order to provide a film and articles that is more easily recyclable. The polyethylene-based compositions of the present invention are particularly advantageous in proving films wherein the film is formed primarily from polyolefins such as polyethylene and/or polypropylene. For example, a coated film wherein the film comprises primarily polyethylene or polypropylene has an improved recyclability profile in addition to other advantages that the usage of such polymers may provide. In some embodiments, the film comprises 95 weight percent or more polyethylene based on the total weight of the film. In other embodiments, the film comprises 96 weight percent or more, 97 weight percent or more, 98 weight percent or more, or 99 weight percent or more polyethylene based on the total weight of the film.

In some embodiments, the film comprising a layer formed from the inventive polyethylene-based composition can be laminated to another film.

Films of the present invention, in some embodiments, can be corona treated and/or printed (e.g., reverse or surface printed) using techniques known to those of skill in the art.

In some embodiments, films of the present invention can be oriented, uniaxially (e.g., in the machine direction) or biaxially using techniques known to those of skill in the art.

Articles

Embodiments of the present invention also relate to articles, such as packages, formed from or incorporating polyethylene-based compositions of the present invention (or films incorporating polyethylene-based compositions of the present invention). Such packages can be formed from any of the polyethylene-based compositions of the present invention (or films incorporating polyethylene-based compositions of the present invention) described herein. Polyethylene-based compositions of the present invention are particularly useful in articles where a high water vapor barrier is desired.

Examples of such articles can include flexible packages, pouches, stand-up pouches, and pre-made packages or pouches. In some embodiments, multilayer films or laminates of the present invention can be used for food packages. Examples of food that can be included in such packages include meats, cheeses, cereal, nuts, juices, sauces, and others. Such packages can be formed using techniques known to those of skill in the art based on the teachings herein and based on the particular use for the package (e.g., type of food, amount of food, etc.).

Test Methods

Unless otherwise indicated herein, the following analytical methods are used in describing aspects of the present invention:

Melt Index

Melt indices $I_2$ (or I2) and $I_{10}$ (or I10) were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Water Vapor Transmission Rate

The WVTR of a film is measured with a Mocon W3/33 according to ASTM F1249-06 at 38° C., 100% relative humidity, and a thickness of ~50 microns.

Conventional Gel Permeation Chromatography (Conv. GPC)

A GPC-IR high temperature chromatographic system from PolymerChar (Valencia, Spain), is equipped with a Precision Detectors (Amherst, Mass.), 2-angle laser light scattering detector Model 2040, an IRS infra-red detector and a 4-capillary viscometer, both from PolymerChar. Data collection is performed using PolymerChar Instrument Control software and data collection interface. The system is equipped with an on-line, solvent degas device and pumping system from Agilent Technologies (Santa Clara, Calif.).

Injection temperature is controlled at 150 degrees Celsius. The columns used are three, 10-micron "Mixed-B" columns from Polymer Laboratories (Shropshire, UK). The solvent used is 1,2,4-trichlorobenzene. The samples are prepared at a concentration of "0.1 grams of polymer in 50 milliliters of solvent." The chromatographic solvent and the sample preparation solvent each contained "200 ppm of butylated hydroxytoluene (BHT)." Both solvent sources are nitrogen sparged. Ethylene-based polymer samples are stirred gently at 160 degrees Celsius for three hours. The injection volume is "200 microliters,' and the flow rate is "1 milliliters/minute." The GPC column set is calibrated by running 21 "narrow molecular weight distribution" polystyrene standards. The molecular weight (MW) of the standards ranges from 580 to 8,400,000 g/mole, and the standards are contained in six "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards are dissolved at 80° C., with gentle agitation, for 30 minutes. The narrow standards mixtures are run first, and in order of decreasing "highest molecular weight component," to minimize degradation. The polystyrene standard peak molecular weights are converted to polyethylene molecular weight using Equation 1 (as described in Williams and Ward, J. Polym. Sci., Polym. Letters, 6, 621 (1968)):

$$M\text{polyethylene}=A\times(M\text{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) are calculated according to Equations 2-4 below.

$$Mn(conv\ gpc) = \frac{\sum_{i=RV_{integration\ start}}^{i=RV_{integration\ end}} \left(IR_{measurement\ channel_i}\right)}{\sum_{i=RV_{integration\ start}}^{i=RV_{integration\ end}} \left(IR_{measurement\ channel_i}/M_{PE_i}\right)} \quad \text{(Eqn. 2)}$$

$$Mw(conv\ gpc) = \frac{\sum_{i=RV_{integration\ start}}^{i=RV_{integration\ end}} \left(M_{PE_i} IR_{measurement\ channel_i}\right)}{\sum_{i=RV_{integration\ start}}^{i=RV_{integration\ end}} \left(IR_{measurement\ channel_i}\right)} \quad \text{(Eqn. 3)}$$

$$Mz(conv\ gpc) = \frac{\sum_{i=RV_{integration\ start}}^{i=RV_{integration\ end}} \left(M_{PE_i}^2 IR_{measurement\ channel_i}\right)}{\sum_{i=RV_{integration\ start}}^{i=RV_{integration\ end}} \left(M_{PE_i} IR_{measurement\ channel_i}\right)} \quad \text{(Eqn. 4)}$$

In Equations 2-4, the RV is column retention volume (linearly-spaced), collected at "1 point per second," the JR is the baseline-subtracted JR detector signal, in Volts, from the IRS measurement channel of the GPC instrument, and $M_{PE}$ is the polyethylene-equivalent MW determined from Equation 1. Data calculation are performed using "GPC One software (version 2.013H)" from PolymerChar.

Creep Zero Shear Viscosity Measurement Method

Zero-shear viscosities are obtained via creep tests, which are conducted on an AR G2 stress controlled rheometer (TA Instruments; New Castle, Del.), using "25-mm-diameter" parallel plates, at 190° C. The rheometer oven is set to test temperature for at least 30 minutes, prior to zeroing the fixtures. At the testing temperature, a compression molded sample disk is inserted between the plates, and allowed to come to equilibrium for five minutes. The upper plate is then lowered down to 50 μm (instrument setting) above the desired testing gap (1.5 mm). Any superfluous material is trimmed off, and the upper plate is lowered to the desired gap. Measurements are done under nitrogen purging, at a flow rate of 5 L/min. The default creep time is set for two hours. Each sample is compression-molded into a "2 mm thick×25 mm diameter" circular plaque, at 177° C., for five minutes, under 10 MPa pressure, in air. The sample is then taken out of the press and placed on a counter top to cool.

A constant low shear stress of 20 Pa is applied for all of the samples, to ensure that the steady state shear rate was low enough to be in the Newtonian region. The resulting steady state shear rates are in the range from $10^{-3}$ to $10^{-4}$ s$^{-1}$ for the samples in this study. Steady state is determined by taking a linear regression for all the data, in the last 10% time window of the plot of "log(J(t)) vs. log(t)," where J(t) is creep compliance and t is creep time. If the slope of the linear regression is greater than 0.97, steady state is considered to be reached, then the creep test is stopped. In all cases in this study, the slope meets the criterion within one hour. The steady state shear rate is determined from the slope of the linear regression of all of the data points, in the last 10% time window of the plot of "a vs. t," where a is strain. The creep zero shear viscosity is determined from the ratio of the applied stress to the steady state shear rate.

In order to determine if the sample was degraded during the creep test, a small amplitude oscillatory shear test is conducted before, and after, the creep test, on the same specimen from 0.1 to 100 rad/s. The complex viscosity values of the two tests are compared. If the difference of the viscosity values, at 0.1 rad/s, is greater than 5%, the sample was considered to have degraded during the creep test, and the result is discarded.

Zero-Shear Viscosity Ratio (ZSVR)

The zero-shear viscosity ratio (ZSVR) is defined as the ratio of the zero-shear viscosity (ZSV) of the branched polyethylene material to the ZSV of the linear polyethylene material at the equivalent average molecular wt. according to the equation:

$$ZSVR = \eta_{0B}/\eta_{0L} = \eta_{0B}/(2.29^{-15} \times Mwt^{3.65})$$

The ZSV value is obtained from a creep test at 190° C., via the method described above. The Mwt is determined using conventional gel permeation chromatography, as described above. The correlation between the ZSV of linear polyethylene and its molecular weight was established based on a series of linear polyethylene reference materials. Lower ZSVR indicates lower level of long chain branching.

Branching Measurements Using $^{13}$C NMR

Sample Preparation

The samples are prepared by adding approximately 2.7 g of a 50/50 mixture of tetrachloroethane-d2/orthodichlorobenzene containing 0.025 M Cr(AcAc)$_3$ as a relaxation agent, to a 0.20 to 0.30 g sample in a Norell 1001-7 10 mm NMR tube. Oxygen is removed by purging the tube with N2 for 1 minute. The samples are dissolved and homogenized by heating the tube and its contents to 120-140° C. using a heating block and vortex mixer. Each sample is visually inspected to ensure homogeneity. The thoroughly mixed samples are not allowed to cool before insertion into the heated NMR sample changer and/or NMR probe.

Data Acquisition Parameters

The data are collected using a Bruker 600 MHz spectrometer equipped with a Bruker 10 mm multinuclear high-temperature CryoProbe. The data are acquired using 1280 transients per data file, a 7.8 sec pulse repetition delay, 90 degree flip angles, and inverse gated decoupling with a sample temperature of 120° C. All measurements are made on non-spinning samples in locked mode. Samples are allowed to thermally equilibrate prior to data acquisition. The $^{13}$C NMR chemical shifts are internally referenced to the EEE triad at 30.0 ppm. The data is processed into a spectrum, appropriate peaks are integrated (quantitating the branches), and then one or more peak integral values are used or averaged for the total branches/1000 C. In the event that no branching is detected, the integrals and signal-to-noise ratio of peaks such as those due to chain ends are used to calculate the limit of detection of the spectrum.

Unsaturation Measurements Using $^1$H NMR

A stock solution (3.26 g) is added to 0.10 to 0.13 g of the polymer sample in a 10 mm NMR tube. The stock solution is either a mixture of tetrachloroethane-d2 (TCE) and perchloroethylene (50:50, w:w) with 0.001M Cr$^{3+}$ or 100% TCE with 0.001M Cr$^{3+}$. The solution in the tube is sparged with N$_2$ for 5 minutes to reduce the amount of oxygen. The sample is dissolved at 120 to 140° C. with periodic vortex mixing. Each $^1$H NMR analysis is run with a 10 mm cryoprobe, at 120° C., on a Bruker AVANCE 600 MHz spectrometer.

Two experiments are run to measure unsaturation: one control and one double presaturation experiment. For the control experiment, the data are processed with an exponential window function with 0.7 Hz line broadening. The signal from residual $^1$H of TCE is set to 100, the integral ($I_{total}$) from about −0.5 to 3 ppm is used as the signal from the whole polymer in the control experiment. The number of total carbons, NC, in the polymer is calculated as follows in Equation 1A:

$$NC = I_{total}/2 \quad \text{(Eqn. 1A)}.$$

For the double presaturation experiment, the data are processed with an exponential window function with 0.7 Hz line broadening, and the baseline is corrected from about 7 to 4 ppm. The signal from residual $^1$H of TCE is set to 100, and the corresponding integrals for unsaturations ($I_{vinylene}$, $I_{trisubstituted}$, $I_{vinyl}$ and $I_{vinylidene}$) are integrated. It is well known to use NMR spectroscopic methods for determining polyethylene unsaturation, for example see Busico, V., et al., *Macromolecules*, 2005, 38, 6988. The number of unsaturation units for vinylene, trisubstituted, vinyl and vinylidene are calculated as follows:

$$N_{vinylene} = I_{vinylene}/2 \quad \text{(Eqn. 2A)},$$

$$N_{trisubstituted} = I_{trisubstituted} \quad \text{(Eqn. 3A)},$$

$$N_{vinyl} = I_{vinyl}/2 \quad \text{(Eqn. 4A)},$$

$$N_{vinylidene} = I_{vinylidene}/2 \quad \text{(Eqn. 5A)}.$$

The unsaturation units per 1,000 total carbons, i.e., all polymer carbons including backbone and branches, are calculated as:

$$N_{vinylene}/1{,}000\ C = (N_{vinylene}/NC)*1{,}000 \quad \text{(Eqn. 6A)},$$

$$N_{trisubstituted}/1{,}000\ C = (N_{trisubstituted}/NC)*1{,}000 \quad \text{(Eqn. 7A)},$$

$$N_{vinyl}/1{,}000\ C = (N_{vinyl}/NCH_2)*1{,}000 \quad \text{(Eqn. 8A)},$$

$$N_{vinylidene}/1{,}000\ C = (N_{vinylidene}/NC)*1{,}000 \quad \text{(Eqn. 9A)}.$$

The chemical shift reference is set at 6.0 ppm for the $^1$H signal from residual proton from TCE-d2. The control is run with a ZG pulse, NS=16, DS=2, AQ=1.82 s, D1=14 s (where D1 is the relaxation delay). The double presaturation experiment is run with a modified pulse sequence, with O1P=1.354 ppm, O2P=0.960 ppm, NS=50, AQ=1.82 s, D1=1 s (where D1 is the presaturation time), D13=13 s (where D13 is the relaxation delay).

Some embodiments of the invention will now be described in detail in the following Examples.

EXAMPLES

Polyethylene Composition 1

The embodiments of inventive polyethylene-based compositions described in the Examples below utilize Polyethylene Composition 1 and Polyethylene Composition 2. Polyethylene Composition 1 is prepared according to the following process and based on the reaction conditions reported in Table 1.

All raw materials (ethylene monomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent feed is pressurized via a pump to above reaction pressure. The individual catalyst components are manually batch diluted to specified component concentrations with purified solvent and pressured to above reaction pressure. All reaction feed flows are measured with mass flow meters and independently controlled with computer automated valve control systems.

The continuous solution polymerization reactors consist of two liquid full, non-adiabatic, isothermal, circulating, loop reactors which mimic continuously stirred tank reactors (CSTRs) with heat removal. Independent control of all fresh solvent, monomer, hydrogen, and catalyst component feeds to each reactor is possible. The total fresh feed streams to each reactor (solvent, monomer, and hydrogen) are temperature controlled by passing the feed stream through a heat exchanger. The total fresh feed to each polymerization reactor is injected into the reactor at two locations per reactor roughly with equal reactor volumes between each injection location. The fresh feed to the first reactor is controlled typically with each injector receiving half of the total fresh feed mass flow. The fresh feed to the second reactor in series is controlled typically to maintain half of the total ethylene mass flow near each injector, and since the non-reacted ethylene from the first reactor enters the second reactor adjacent to the lower pressure fresh feed this injector usually has less than half of the total fresh feed mass flow to the second reactor.

The catalyst/cocatalyst components for each reactor are injected into the polymerization reactor through specially designed injection stingers. Each catalyst/cocatalyst component is separately injected into the same relative location in the reactor with no contact time prior to the reactor. The primary catalyst component is computer controlled to maintain the individual reactor monomer conversion at the specified target. The cocatalyst components are fed based on calculated specified molar ratios to the primary catalyst component.

The catalyst used in the first reactor is zirconium, [[2,2'''-[[bis[1-methylethyl)germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula $C_{86}H_{128}F_2GeO_4Zr$ and the following structure ("Catalyst 1"):

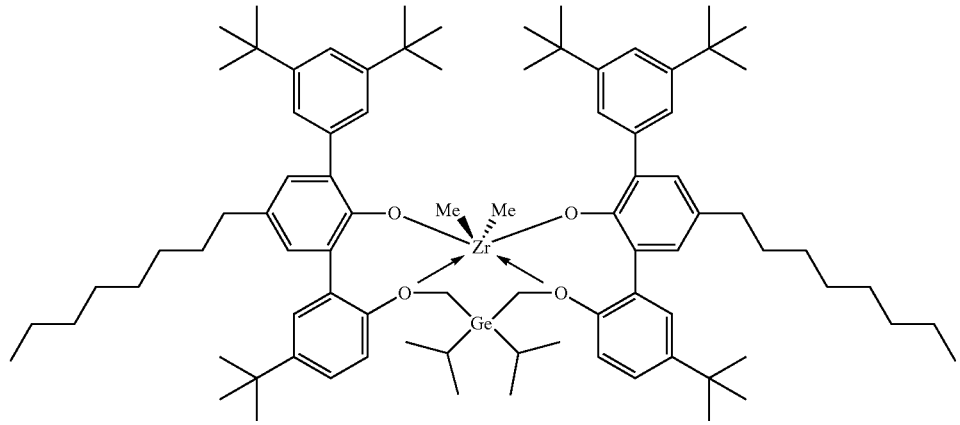

The catalyst used in the second reactor is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula $C_{107}H_{154}N_2O_4Si_2Zr$ and the following structure ("Catalyst 2"):

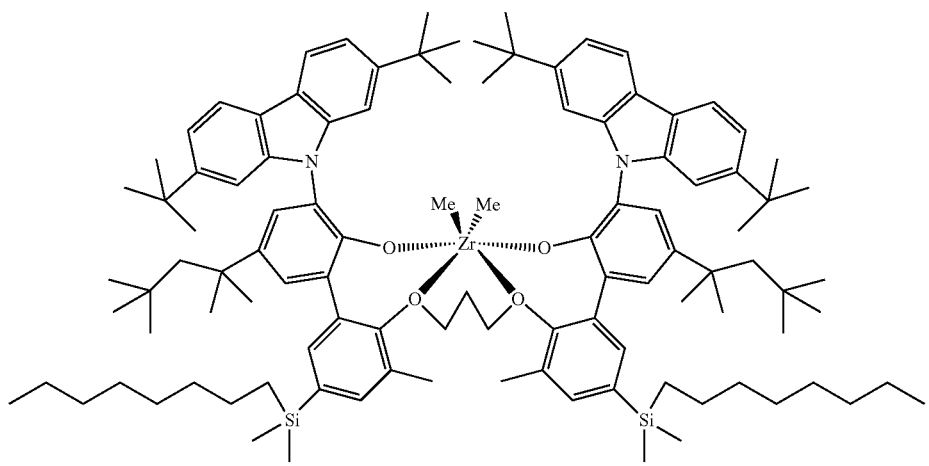

Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified reactor temperature. Circulation around each reactor loop is provided by a pump.

The effluent from the first polymerization reactor (containing solvent, monomer, hydrogen, catalyst components, and dissolved polymer) exits the first reactor loop and passes through a control valve (responsible for controlling the pressure of the first reactor at a specified target) and is injected into the second polymerization reactor of similar design. The final effluent from the second polymerization reactor enters a zone where it is deactivated with the addition of and reaction with a suitable reagent (water). At this same reactor exit location other additives are added for polymer stabilization. This final effluent stream passes through another set of static mixing elements to facilitate the deactivation of the catalyst and dispersion of the additives.

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent is recycled back to the reactor after passing through a purification system. A small amount of solvent is purged from the process. Polyethylene Composition 1 was stabilized with minor (ppm) amounts of stabilizers.

The polymerization conditions for Polyethylene Composition 1 are reported in Table 1. As seen in Table 1, Cocat. 1 (bis(hydrogenated tallow alkyl)methyl, tetrakis(pentafluorophenyl)borate(1-) amine); and Cocat. 2 (modified methyl aluminoxane (MMAO)) are each used as a cocatalyst for Catalyst 1 and Catalyst 2.

Polyethylene Composition 2 is prepared using the same catalyst system as Polyethylene Composition 1, and using the same process with comparable reaction conditions.

Additional properties of Polyethylene Composition 1 and Polyethylene Composition 2 are measured using the Test Methods described above, and are reported in Table 2. The First Polyethylene Fraction refers to the polyethylene component from the first reactor, and the Second Polyethylene Fraction refers to the polyethylene fraction from the second reactor.

TABLE 1

|  |  | Polyethylene Composition 1 |
|---|---|---|
| First Reactor Feed Solvent/Ethylene Mass Flow Ratio | g/g | 6.3 |
| First Reactor Feed Hydrogen/Ethylene Mass Flow Ratio | g/g | 1.5E−04 |
| First Reactor Temperature | ° C. | 155 |
| First Reactor Pressure | barg | 50 |
| First Reactor Ethylene Conversion | % | 69.4 |
| First Reactor Catalyst Type | Type | Catalyst 1 |
| First Reactor Co-Catalyst 1 Type | Type | Cocat. 1 |
| First Reactor Co-Catalyst 2 Type | Type | Cocat. 2 |
| First Reactor Co-Catalyst 1 to Catalyst Molar Ratio (B to Zr ratio) | Ratio | 1.5 |
| First Reactor Co-Catalyst 2 to Catalyst Molar Ratio (Al to Zr ratio) | Ratio | 12.5 |
| Second Reactor Feed Solvent/Ethylene Mass Flow Ratio | g/g | 2.6 |
| Second Reactor Feed Hydrogen/Ethylene Mass Flow Ratio | g/g | 9.2E−04 |
| Second Reactor Temperature | ° C. | 205 |
| Second Reactor Pressure | barg | 50 |
| Second Reactor Ethylene Conversion | % | 91.1 |
| Second Reactor Catalyst Type | Type | Catalyst 2 |
| Second Reactor Co-Catalyst 1 Type | Type | Cocat. 1 |
| Second Reactor Co-Catalyst 2 Type | Type | Cocat. 2 |
| Second Reactor Co-Catalyst 1 to Catalyst Molar Ratio (B to Zr ratio) | mol/mol | 1.8 |
| Second Reactor Co-Catalyst 2 to Catalyst Molar Ratio (Al to Zr ratio) | mol/mol | 22.9 |

TABLE 2

|  | Unit | Polyethylene Composition 1 | Polyethylene Composition 2 |
|---|---|---|---|
| Density | g/cm$^3$ | 0.9668 | 0.9691 |
| $I_2$ | g/10 min | 1.10 | 1.10 |
| $I_{10}/I_2$ |  | 13.54 | 15.6 |
| $I_{21}/I_2$ |  | 89.8 | 130 |
| Mn (conv. gpc) | g/mol | 11,516 | 10,308 |
| Mw (conv. gpc) |  | 112,551 | 113,495 |
| Mz (conv. gpc) |  | 423,716 | 441,612 |
| Mw/Mn |  | 9.77 | 11.01 |

TABLE 2-continued

|  | Unit | Polyethylene Composition 1 | Polyethylene Composition 2 |
|---|---|---|---|
| (conv. gpc) |  |  |  |
| Mz/Mw | | 3.76 | 3.89 |
| (conv. gpc) | | | |
| Eta* (0.1 rad/s) | Paos | 7,921 | 7,934 |
| Eta* (1.0 rad/s) | Paos | 6,356 | 6,554 |
| Eta* (10 rad/s) | Paos | 3,444 | 3,518 |
| Eta* (100 rad/s) | Paos | 1,016 | 1,002 |
| Eta*0.1/ Eta*100 | | 7.79 | 7.91 |
| Eta zero | Paos | 9,148 | 8,959 |
| Branches (using $^{13}$C NMR) | Per 1000 total Carbons | <0.03 | <0.03 |
| Non-vinyl Unsaturations (using $^{1}$H NMR) | Per 1,000,000 total Carbons | Not Detected* | Not Detected* |
| ZSVR | | 1.46 | 1.39 |
| First Polyethylene Fraction | | | |
| Wt. % of Polyethylene Composition 1 | % | 35% | 35% |
| Density | g/cm$^3$ | 0.945 | <0.947** |
| I$_2$ | g/10 minutes | ~0.06 | ~0.06** |
| Second Polyethylene Fraction | | | |
| Wt. % of Polyethylene Composition 1 | % | 65% | 65% |
| Density | g/cm$^3$ | 0.979 | 0.979 |
| I$_2$ | g/10 minutes | ~700 | ~700 |

*The limit of detection for this measurement was <3.
**Target

The densities of the first polyethylene fraction for Polyethylene Composition 1, the overall Polyethylene Composition 1, and the overall Polyethylene Composition 2 are measured as described above in the Test Methods section. The density of the first polyethylene fraction for Polyethylene Composition 2 is the target value. The density of the second polyethylene fraction is calculated using the following blend rule:

$$\text{Density} = \frac{1}{\left(\frac{\text{Amount of First } PE \text{ Fraction}}{\text{Density of First } PE \text{ Fraction}}\right) + \left(\frac{\text{Amount of Second } PE \text{ Fraction}}{\text{Density of Second } PE \text{ Fraction}}\right)}$$

Polyethylene Composition 1 and Polyethylene Compositions 2 are evaluated relative to two comparative resins. Comparative Composition A is ELITE™ 5960G, a high density enhanced polyethylene resin commercially available from The Dow Chemical Company that does not include Hyperform HPN-20E. Comparative Composition A has a density of 0.962 g/cm$^3$ and a melt index (I$_2$) of 0.85 g/10 minutes. Comparative Composition B is a commercially available high density polyethylene resin that has a density of 0.967 g/cm$^3$ and a melt index (I$_2$) of 1.2 g/10 minutes, and that contains ~1200 ppm of Hyperform HPN-20E. Table 3 illustrates some of the differences in the polymer design of these resins.

TABLE 3

|  | M$_n$ (conv GPC) | M$_w$ (conv GPC) | M$_z$ (conv GPC) | M$_w$/M$_n$ (conv GPC) | M$_z$/M$_w$ (conv GPC) | ZSVR |
|---|---|---|---|---|---|---|
| Polyethylene Composition 1 | 11,516 | 112,551 | 423,716 | 9.77 | 3.76 | 1.46 |
| Polyethylene Composition 2 | 10,308 | 113,495 | 441,612 | 11.01 | 3.89 | 1.39 |
| Comparative Composition A | 15,211 | 102,497 | 304,605 | 6.7 | 2.97 | 8.66 |
| Comparative Composition B | 8,794 | 100,870 | 332,753 | 11.5 | 3.30 | 2.39 |

Example 1

Polyethylene Composition 1 and Comparative Compositions A and B are evaluated on a blown film line. The resins are dry blended with an Hyperform HPN-20E nucleating agent (Milliken Chemical) provided in a masterbatch to target different final loadings of the HPN-20E nucleating agent ("HPN-20E") (targets: 0, 250, 750, 1250, 2500, and 5000 ppm HPN-20E loading) and furthermore to evaluate moisture vapor barrier properties (MVTR or WVTR). The masterbatch with HPN-20E includes 3 weight percent of HPN-20E, 1.5 weight percent silica, 0.5 weight percent hydrotalcite, 5 weight percent antioxidant, and 90 weight percent of a carrier resin. The carrier resin is a narrow molecular weight distribution high density polyethylene homopolymer having a density of 0.965 g/cm$^3$ and a melt index (I$_2$) of 8.0 g/10 minutes. The Hyperform HPN-20E comprises ~66 weight percent of calcium salt of 1,2-cyclohexanedicarboxylic acid and ~34 weight percent of zinc stearate/zinc palmitate.

The blown film line utilizes a twin screw extruder in which the specified resin and nucleating agent are dry blended and melted prior to being sent to a two inch diameter extrusion ring at a nominal rate of 15 lbs/hr. The extruder die temperature is set between 215 and 235° C. The blown film structure is a monolayer film with a target thickness of 2 mils. The blow-up ratio is targeted to be 2.5, the frost line height ranged from ~9 to 11 inches, and the lay flat was ~7.9 inches. Approximately 100 feet of bubble film is produced and split into two films.

The water vapor transmission rates (WVTR) of the films are measured, with a WVTR of 0.10 (g-mil)/(100 in$^2$·day) being particularly desirable. The results are shown in Table 4 in units of (g-mil)/(100 in$^2$·day).

TABLE 4

| Amount of HPN-20E (ppm) | WVTR of Polyethylene Composition 1 [(g-mil)/(100 in$^2$ · day)] | WVTR of Comparative Composition A [(g-mil)/(100 in$^2$ · day)] | WVTR of Comparative Composition B [(g-mil)/(100 in$^2$ · day)] |
|---|---|---|---|
| 0 | 0.23 | 0.38 | — |
| 250 | 0.09 | 0.22 | — |
| 750 | 0.14 | 0.20 | — |
| 1250 | 0.11 | 0.15 | 0.10 |
| 2500 | 0.16 | 0.18 | 0.14 |
| 5000 | 0.21 | 0.21 | 0.20 |

The compositions that are blends of Polyethylene Composition 1 and HPN-20E, particularly at 250-1250 ppm, represent polyethylene-based compositions according to some embodiments of the present invention. The compositions that are blends with Comparative Composition A or Comparative Composition B are comparative examples. Note that data for Comparative Composition B are not available at 0-750 ppm because it is commercially available with ~1200 ppm of HPN-20E. The inventive polyethylene-based composition with HPN-20E at 250 ppm provides the best WVTR performance.

Example 2

Additional film samples are made using a Dr. Collin 3-layer coextrusion blown film line. Instead of a twin screw extruder that was used in Example 1, this blown film line has a single screw extruder that feeds a 2.36 inch diameter extrusion ring. The nominal run rate is 30 lbs/hr with the extruder die temperature was set at ~215° C. The blown film structure is a monolayer film with a target thickness of 2 mils. The blow-up ratio is targeted to be 2.5, the frost line height is ~5.5 inches, and the lay flat was ~10 inches. Approximately 100 feet of bubble film is produced and split into two films.

Three polyethylene-based compositions are made with Polyethylene Composition 1 by: (1) dry blending Polyethylene Composition 1 with an HPN-20E masterbatch (as described in Example 1) in the single screw extruder at the blown film line ("Dry Blended"); (2) melt blending Polyethylene Composition 1 and HPN-20E on a ZSK-26 extruder prior to providing the blend composition to the blown film line ("Melt Blended"); and (3) melt blending Polyethylene Composition 1 and an HPN-20E masterbatch (as described in Example 1) on a ZSK-26 extruder and subsequently reprocessing that blend composition a second time on the ZSL-26 extruder prior to providing the blend to the blown film line ("Melt Blended x2"). The results are shown in Table 5.

TABLE 5

| Amount of HPN-20E (ppm) | WVTR of Polyethylene Composition 1 (Dry Blend) [(g-mil)/(100 in² · day)] | WVTR of Polyethylene Composition 1 (Melt Blended) [(g-mil)/(100 in² · day)] | WVTR of Polyethylene Composition 1 (Melt Blended x2) [(g-mil)/(100 in² · day)] |
| --- | --- | --- | --- |
| 0 | 0.23 | — | — |
| 250 | 0.14 | 0.08 | 0.08 |
| 750 | 0.10 | — | — |
| 1250 | 0.11 | 0.11 | 0.12 |

Each of the above compositions utilizing 250-750 ppm of HPN-20E represent polyethylene-based compositions according to some embodiments of the present invention. In particular, the melt blending of Polyethylene Composition 1 with 250 HPN-20E provided particularly desirable WVTR values, nearly 20% lower than Comparative Composition B.

Example 3

For this example, a number of multilayer films are made using a 7-layer Alpine blown film line. The multilayer films are produced with five distinct layers that have a total nominal thickness of 2.2 mils and are formed at a blow-up ratio of 2.5. The film structure is: Layer A (15%)/Layer B (20%)/Layer C (30%)/Layer D (20%)/Layer E (15%). Layer A is formed from ELITE™ 5960G1 (The Dow Chemical Company). Layers B and D are each formed with INNATE™ TH 60 (The Dow Chemical Company). Layer E is a sealant layer and is formed with SEALUTION™ 220 (The Dow Chemical Company). Layer C is a barrier layer and is described further in Table 6 below. The blends of Polyethylene Composition 1 and a masterbatch HPN-20E (as described in Example 1) are either dry blended in the extruder feeding the Alpine blown film line ("Dry Blended"), or melt blended with a ZSK40 twin screw extruder before being provided to the extruder feeding the Alpine blown film line ("Melt Blended"). Comparative Composition B is evaluated in Layer C as commercially available. The WVTR of the samples are measured and the results are shown in Table 6.

TABLE 6

| Layer C Composition | WVTR [(g-mil)/(100 in² · day)], normalized to the total film thickness (2.2 mils) |
| --- | --- |
| Comparative Composition B (average of 2 trials) | 0.31 |
| Polyethylene Composition 1 + 250 ppm (Dry Blended) | 0.38 |
| Polyethylene Composition 1 + 750 ppm (Dry Blended) | 0.31 |
| Polyethylene Composition 1 + 750 ppm (Melt Blended) | 0.26 |
| Polyethylene Composition 1 + 1500 ppm (Dry Blended) | 0.31 |

The blends of Polyethylene Compositions 1 and 250-750 ppm HPN-20E represent polyethylene-based compositions according to some embodiments of the present invention. Providing polyethylene-based compositions with 750 ppm of HPN-20E results in particularly desirable WVTR results. In particular, the melt blending of Polyethylene Composition 1 with 750 ppm of HPN-20E provides an improvement in WVTR of ~15% over Comparative Composition B.

Example 4

In this example, the dusting of films formed from Polyethylene Composition 2 and Comparative Resin B are compared.

Polyethylene Composition 2 is melt blended with an Hyperform HPN-20E nucleating agent (Milliken Chemical) ("HPN-20E") provided in a masterbatch, along with silica, hydrotalcite, antioxidant, and a HDPE carrier resin. The masterbatch includes 3 weight percent of HPN-20E, 1.5 weight percent silica, 0.5 weight percent hydrotalcite, 5 weight percent antioxidant, and 90 weight percent of a carrier resin. The carrier resin is a narrow molecular weight distribution high density polyethylene homopolymer having a density of 0.965 g/cm³ and a melt index ($I_2$) of 8.0 g/10 minutes. The Hyperform HPN-20E comprises ~66 weight percent of calcium salt of 1,2-cyclohexanedicarboxylic acid and ~34 weight percent of zinc stearate/zinc palmitate. The inventive polyethylene-based composition formed from Polyethylene Composition 2 and the masterbatch ("Polyethylene-based Composition 2") includes 750 ppm of HPN-20E, 375 ppm of silica, 125 ppm of hydrotalcite, and 1,250 ppm of antioxidants, based on the total weight of the polyethylene-based composition.

Comparative Composition B contains ~1200 ppm of HPN-20E and is not believed to include any silica.

Monolayer films having a target thickness of 2 mils are produced from Polyethylene-based Composition 2 and Comparative Composition B on a blown film line. The blown film line is equipped with a screw single screw extruder using a 8 inch DSB II screw design capable of an output rate near 600 lbs/hr of polyethylene. A target temperature profile during extrusion is 177° C., 218° C., 193° C., 163° C., 163° C., 221° C., and 227° C. through barrels 1-5, the screen block, and lower-upper die respectively. To produce the films, the Compositions are sent to an 8 inch blown film die with a 70 mil die gap and an output rate of 10.4 lb/hr/in of die circumference. A target melt temperature is 227° C., and the blow-up ratio is maintained at 2.5 to 1. The air temperature in the air ring and air cooling unit is 7.2° C. The frost line height is an average of 34 inches. Film thickness is controlled within ±10% at 2 mils by adjusting the nip roller speed. The layflat of the bubble is 31 inches wide. The films are wound up into a roll before slitting.

The films are evaluated for dusting. Dust from the films is collected on 8.5 inch×11 inch black felt sheets adhered to a stationary roller on a slitter/rewinder machine. The films slid over the stationary felt sheets as they were wound through the machine. Dust is collected from 800 feet of each sample at a 200 feet/min run rate. The black felt samples are then carefully removed and visually inspected. The film samples formed from Polyethylene-based Composition 2 exhibited less dusting than the film samples formed from Comparative Composition B.

That which is claimed:

1. A polyethylene-based composition suitable for packaging applications comprising:
   (a) at least 97% by weight, based on the total weight of the polyethylene-based composition, of a polyethylene composition comprising:
      (i) from 25 to 37 percent by weight of a first polyethylene fraction having a density in the range of 0.935 to 0.947 g/cm$^3$ and a melt index ($I_2$) of less than 0.1 g/10 minutes; and
      (ii) from 63 to 75 percent by weight of a second polyethylene fraction; and
   (b) 90 to 540 ppm, based on the total weight of the polyethylene-based composition of a calcium salt of 1,2-cyclohexanedicarboxylic acid;
   wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

2. The polyethylene-based composition of claim 1, wherein the polyethylene composition comprises from 25 to 37 percent by weight of the first polyethylene fraction having a density in the range of 0.940 to 0.947 g/cm$^3$ and from 63 to 75 percent by weight of the second polyethylene fraction having a density of 0.970 g/cm$^3$ or greater.

3. The polyethylene-based composition of claim 1, wherein the melt index ($I_2$) of the polyethylene-based composition is 0.5 to 2.5 g/10 minutes.

4. The polyethylene-based composition of claim 1, wherein the ratio of the melt index ($I_2$) of the second polyethylene fraction to the melt index ($I_2$) of the first polyethylene fraction is at least 1,000.

5. The polyethylene-based composition of claim 1, wherein the polyethylene-based composition has a zero shear viscosity ratio of less than 2.0.

6. The polyethylene-based composition of claim 1 further comprising a fatty acid metal salt in the amount of 45 to 360 ppm, based on the total weight of the composition.

7. The polyethylene-based composition of claim 1 further comprising silica in the amount of 75 to 800 ppm, based on the total weight of the composition.

8. The polyethylene-based composition of claim 1, wherein the polyethylene composition has less than 25 non-vinyl unsaturations per 1 million carbons.

9. A film comprising the polyethylene-based composition according to claim 1.

10. An article comprising the polyethylene-based composition according to claim 1.

* * * * *